United States Patent [19]

Lilani et al.

[11] Patent Number: 4,743,495

[45] Date of Patent: May 10, 1988

[54] SEAT CUSHION FIRE BLOCKING FABRIC

[75] Inventors: Harish N. Lilani, Plymouth Meeting; John W. Weber, Sr. deceased, late of Norristown, both of Pa., by John Weber Jr., executor

[73] Assignee: Amatex Corporation, Norristown, Pa.

[21] Appl. No.: 15,172

[22] Filed: Feb. 17, 1987

[51] Int. Cl.$^4$ .............................................. B32B 1/04
[52] U.S. Cl. ..................................... 428/234; 428/251; 428/282; 428/285; 428/286; 428/300; 428/921
[58] Field of Search ............... 428/234, 251, 282, 285, 428/286, 300, 920, 921

[56] References Cited

U.S. PATENT DOCUMENTS

| | | |
|---|---|---|
| 2,165,772 | 5/1937 | Walsh et al. |
| 3,392,079 | 7/1968 | Fekete |
| 3,664,905 | 5/1972 | Schuster ................................ 161/59 |
| 4,162,190 | 7/1979 | Ashworth ........................... 162/359 |
| 4,284,682 | 8/1981 | Tschirch et al. ..................... 428/263 |
| 4,302,496 | 11/1981 | Donovan ............................. 428/196 |
| 4,529,643 | 7/1985 | Lundström .......................... 428/234 |
| 4,623,571 | 11/1986 | Yamamoto .......................... 428/234 |

OTHER PUBLICATIONS

Copy of Federal Register, Oct. 26, 1984, vol. 49, No. 209, pp. 43188-43200.
Copy of Seat-Wear Test, developed by Boeing Aircraft Company, p. 11, line 29 through p. 12, line 1 of specification.

Primary Examiner—Marion C. McCamish
Attorney, Agent, or Firm—Benasutti & Murray

[57] ABSTRACT

A non woven fire blocking seat fabric particularly suited for aircraft applications is disclosed. The fabric is a nonwoven, multiplied flame resistant fabric comprised of at least two felted plies, each ply being further comprised of fibers selected from the group consisting of aramid fibers, polybenzimidazole fibers, and phenolic fibers, wherein the combined percentage by weight of said aramid and phenolic fibers is approximately 80% by weight of said felted ply with the aramid fibers being present in the range of about 10% to 60% and the phenolic fibers being present in the range of about 20% to 70%.; and the plies are united into a single fabric by fibers which are needled from the respective ply into the other ply. In the preferred fabric a stabilized woven scrim is positioned between the plies of the fabric. In the preferred fabric the scrim is of glass material.

5 Claims, 1 Drawing Sheet

SEAT CUSHION FIRE BLOCKING FABRIC

BACKGROUND OF THE INVENTION

1. Field of the Invention

The present invention resides broadly in the field of fire blocking fabrics and more particularly in the field of seat cushion fire blocking fabrics for aircraft seating and similar applications.

As a result of regulatory amendments adopted in 1972, aircraft seat cushions are typically constructed of fire-retardant polyurethane foam and upholstery covering, all of which must presently pass the Bunsen burner test prescribed in § 25.853 of the FAR. In a prolonged full-scale cabin fire condition, however, severe thermal radiation can break down the outer upholstery covering and penetrate into the relatively large fuel mass of the polyurethane foam core. This causes the core to become involved in the fire, spreading flame and producing potentially lethal smoke, combustible gases, and toxic gases. The results of accident investigations and experimental fire tests conducted by the FAA have demonstrated that this involvement of foam cushion material is a dominant factor in the spread of cabin fire. To counter this, fire retardant performance standards for seat cushions based on the level of protection that may be achieved by the fire blocking layer concept were proposed in Notice 83-14.

The fire blocking layer concept involves the use of a thin layer of highly fire-resistant material to completely encapsulate and protect the larger mass of foam core seat cushion material from involvement in the cabin fire. This layer of fire-resistant material delays the onset of ignition and retards the involvement of the core in the fire.

The initial phase of the FAA research program for fire blocking layers consisted of a series of instrumented controlled environment cabin fire tests which confirmed the efficacy and practicality of fire blocking layers for aircraft seat cushions.

The subsequent phase of the program developed the test for evaluation and certification of cushions, using an adaptation of the type of 2 gallon/hour kerosene burner which is currently in standard use throughout industry as a test for metallic tubing assemblies and components. This test subjects the cushion test specimen to temperature and heat typical of full-scale cabin fire and is far more realistic and severe than the Bunsen burner test currently required in Part 25 for cushion materials.

As a result of the regulatory amendments, notice was provided to the industry that the new operating standards would be required in transport category airplanes type certified after Jan. 1, 1958 and operating under Part 121 and that compliance with the new requirements would be necessary after Nov. 26, 1987. These new requirements are in addition to the present flammability requirements contained in the Federal Aviation Regulations and represent a significant advance in aircraft fire safety.

The FAA recognized that reduction in smoke and toxic gas submission is an important safety issue. Accordingly, the FAA explained that the new cushions will greatly reduce emissions by virtue of their reduced heat and flame spread potential and that this had been proven by full scale cabin fire tests.

When the FAA regulations were submitted for comments, several commentators contended that the requirements should not apply to relatively small transport category airplanes such as executive airplanes and airplanes seating less than forty-four passengers. Several of the commentators contended that the basis for the justification for the requirement is the forty seconds which can be gained in usable evacuation time through use of the improved seat cushions to delay fire spread. The commentators maintained that the benefits, although recognizable in larger aircraft, could not be realized in the smaller aircraft which generally have shorter evacuation times. The FAA did not agree that the benefit of the new requirements would be realized only in larger aircraft. The new requirements were believed to greatly improve the fire safety of those furnishings which make up a major part of the cabin by reducing the potential for ignition and occurrence of fire and by inhibiting fire spread and smoke and toxic gas submission in the event fire does occur. Ignition, flame spread, smoke, and toxic gases are all potential hazards in in-flight fires as well as in those post-crash fires involving emergency evacuation. Although the potential gain in evacuation time is more pronounced in larger aircraft, it was believed that the new requirements would significantly benefit small aircraft as well.

Several commentators contended that the FAA requirement should not apply to flight crew member seats and flight attendant seats. These commentators pointed out that seat comfort has a significant influence on flight crew members performance and efficiency and that there is the possibility fire blocking layers could compromise comfort on flights of long duration. The commentators pointed out that the risk of fire involvement of flight crew members is low because the seats are isolated from passengers and fuel, located near a fire extinguisher and occupied at all times by personnel trained in fire prevention and control. One commentator pointed out that seat cushions of a flight attendant seat are usually thin and that the added thickness and weight of a fire blocking layer might interfere with the seat-retract mechanism.

The FAA agreed with the commentators regarding flight crew member seats. Since in service evaluation of fire blocking materials had not been completed, and those materials with optimal comfort properties had not been identified, it was believed to be premature to require the retrofit of seats, the comfort of which might effect performance of the flight crew members. Since flight attendants did not usually remain in their seats for the duration of the flight, flight attendant seats were not considered as critical as flight crew member seats from the standpoint of comfort and were not excluded from the requirements.

In accordance with the FAA regulations, regarding the flammability of seat cushions, criteria for acceptance and test conditions were established. Furthermore, a test procedure was established.

With respect to the test procedure they are fully set forth in the Federal Register of Friday, Oct. 26, 1984, Part IV, however, as a summary, the testing was to be as follows.

(1) Record the weight of each set of seat bottom and seat back cushion specimens to be tested to the nearest 0.002 pound (9 grams).

(2) Mount the seat bottom and seat back cushion test specimens on the test stand as shown in the regulations securing the seat back cushion specimen to the test stand at the top.

(3) Swing the burner into position and ensure that the distance from the exit of the burner cone to the side of the seat bottom cushion specimen is 4±⅛ inches (102±3 mm).

(4) Swing the burner away from the test position. Turn on the burner and allow it to run for 2 minutes to provide adequate warm up of the burner cone and flame stabilization.

The regulations also set forth a test report which was to be generally as follows. With respect to all specimen sets tested for a particular seat cushion for which testing of compliance is performed, the following information must be recorded:

(1) An identification and description of the specimens being tested.
(2) The number of specimen sets tested.
(3) The initial weight and residual weight of each set, the calculated percentage weight loss of each set, and the calculated average percentage weight loss for the total number of sets tested.
(4) The burn length for each set tested.

As can be seen from the above background of the FAA regulations, which are more fully set forth in the Federal Register of Oct. 26, 1984, Volume 49, No. 209 at pages 43188 through 43200, which is incorporated herein by reference as if fully set forth, the need for improved seat cushion fire blocking potential was recognized as desirable. However, there were a number of problems associated with balancing the safety additions of the revised regulations against the availability of materials, the need for durability and comfort, and the need to avoid excessive weight increase associated with the additional seat blocking materials.

As a result of the foregoing, efforts were undertaken to develop a relatively light weight material which would meet all of the various requirements regarding the fire hazards while preserving durability and passenger comfort. As a result of these efforts, a material was developed which met the technical parameters and testing is underway to establish durability and passenger comfort. Based upon preliminary testing, it appears that the durability of the disclosed material will meet all of the required criteria and that passenger comfort will not be adversely impacted as a result of the addition of the disclosed seat blocking material.

DESCRIPTION OF THE INVENTION

Figure 1:
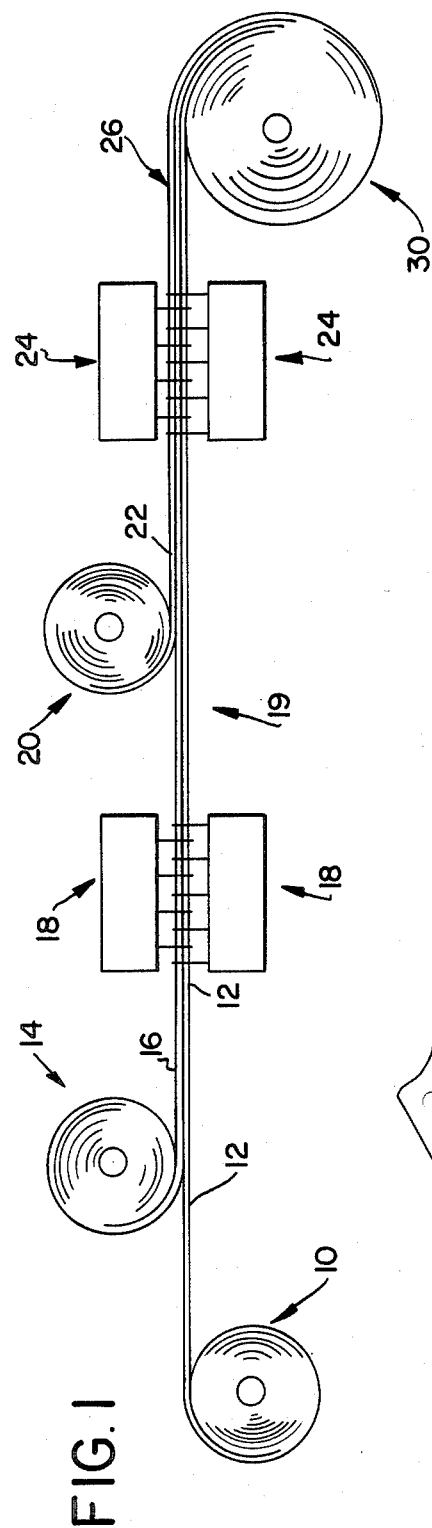
FIG. 1 is an illustrative figure showing one method of producing a two ply fabric according to the instant invention.

The invention will be described with reference to the drawing figures with like numerals indicating like elements throughout.

Figure 3:
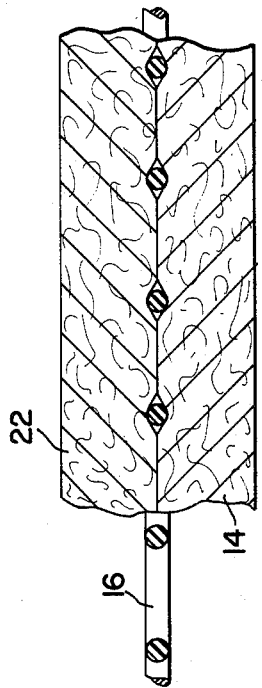
FIG. 3 is a fragmentary section through the fabric produced in accordance with FIG. 1.
Figure 2:
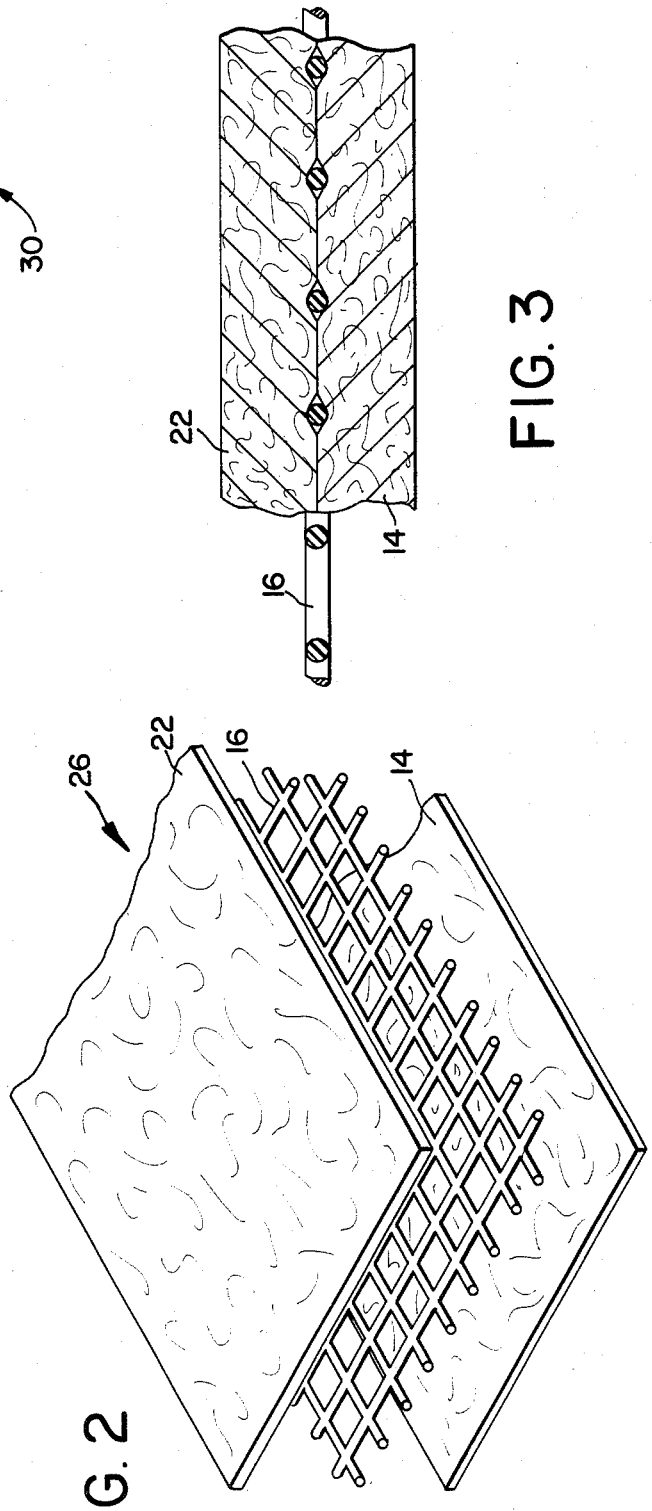
FIG. 2 is an exploded view showing the construction of the fabric produced utilizing the method of FIG. 1.

With reference to FIG. 1, there is illustrated a method for producing a fabric in accordance with the invention. In accordance with this method, a first supply roll of felted material is provided at 10. The felted material 12 is fed in a continuous manner beyond a second supply roll 14. Supply roll 14 provides a scrim material 16 and the combination of felted material 12 and scrim material 16 are presented in continuous fashion to needling heads 18. As a result of the needling action of heads 18, a composite material 19 is produced. Composite material 19 is presented in continuous fashion beneath a third supply roll 20. From supply roll 20, a top layer of felt material is presented adjacent the material 19 and the combination is presented in continuous fashion to needling heads 24. The material is needled as it proceeds through heads 24 and is collected on the take up roll 30 at the exit end of heads 24. As can be seen, the material exiting heads 24 is a three ply material, 26 (FIGS. 2 and 3).

With respect to needling heads 18 and 24, the technique for utilizing such heads will be known to those skilled in the art. It will also be known to those skilled in the art that the number, length and density of the needling elements may be varied according to design characteristics.

The preferred scrim material is a glass material and is comprised of a first system of laid-in yarns and a second system of yarns which are interwoven with the first system of yarns in what is generally referred to as a leno weave. The basic glass scrim material is available from Clark-Swabel of New York, N.Y. and South Carolina and is sold under stock number 1659. For the preferred application the base scrim is treated with an inorganic vermiculite based compound, up to 10% pickup, which stabilizes and imparts flame resistance to the base scrim while preserving open area and flexibility. Such treatments and their application will be known to those skilled in the art and require no further explanation.

In testing the proposed materials a variety of sample fabrics were made to compare the various combinations of preferred materials. In producing the sample fabric, fibers were selected for their strength and thermal resistance. Aramid fibers available from Dupont Company under the trademarks Kevlar and Nomex or Nomex's equivalent fiber Conex were used. Kevlar was selected for its strength and Nomex or Conex fiber, although another aramid fiber, was selected as a carrier fiber for the Kynol which is a weak processing fiber. Polybenzimidazole fibers, known as PBI and available from the Celanese Co. of Chatham, N.J., were selected for open flame resistance. Phenolic fibers, known as Kynol and available from American Kynol, Inc. of Altamonte Springs, Fla., were selected for thermal resistance. In addition, Kynol is cost effective since it is generally avaliable as a less expensive fiber to other similar thermal resistance products.

By way of example, samples were produced using two felt blends. A first felt blend (A) was made by the following formula:

Kevlar: 60% in the blend
PBI: 20% in the blend
Kynol: 20% in the blend

The combined weight of the felt was about 3 oz/yd.

A second blend (B) was made by the following formula:

Kynol: 70% in the blend
Conex: 20% in the blend
Kevlar: 10% in the blend

The combined weight of the second felt was about 3 oz/yd.

Using the above felts various combinations were constructed.

Combination #1: top layer of felt A; 1.5 oz/yd$^2$ untreated fiberglass scrim fabric; and bottom layer of felt B. The approximate weight of the composite fabric was approximately 7.5 oz/yd$^2$.

Combination #2: top layer of felt A; 1.5 oz/yd² untreated fiberglass scrim fabric; and top layer of felt A. The approximate weight of the composite fabric was approximately 7.5 ox/yd².

Combination #3: bottom layer of felt B; 1.5 oz/yd² untreated fiberglass scrim fabric; and bottom layer of felt B. The approximate weight of this composite fabric was also approximately 7.5 oz/yd².

Combination #4: top layer of felt A; ½ mil aluminized Mylar film (as a scrim); and bottom layer of felt B. The approximate weight of this composite fabric was around 6.5 oz/yd².

Combination #5: top layer of felt A; no scrim, and bottom layer of felt B. The approximate weight of this composite fabric was approximately 6 oz/yd².

Combination #6: top layer of felt A; 1.5 oz/yd² treated fiberglass scrim fabric; and bottom layer of felt B. The approximate weight of the composite fabric was approximately 7.5 oz/yd².

As a result of testing, it was determined the no scrim fabric, Combination 5, was not dimensionally satisfactory. The Mylar base aluminum film, Combination 4, was unsatisfactory due to fragmentation of the scrim material during needling. The remaining sample combinations were acceptable and were further tested. Upon further testing Combinations 1, 2, 3, and 6 were found to be thermally unacceptable as a seat blocking material and to lack wear resistance.

As a result of testing, a seventh combination was formulated. The preferred felt blends (A) and (B) (of equal wts. of 3.83 oz/yd) were similar to Combination 6, however, the weight of the fabric was increased to 9.3 oz/yd². An analysis of the preferred fabric provided the following distribution of fiber in the final fabric. Aramid fibers comprised approximately 36.9%, polybenzimidazole fibers comprised approximately 8.2%, phenolic fibers comprised approximately 36.9% and treated glass scrim comprised approximately 18.0%.

Felt (A) of the upper ply had a distribution of:
Kevlar: approximately 24.6%
PBI: approximately 8.2%
Kynol: approximately 8.2%
Felt (B) of the lower ply had a distribution of:
Kynol: approximately 28.7%
Nomex-Conex: approximately 8.2%
Kevlar: approximately 4.1%

In testing it was further determined that the fabric should be further processed by calendaring and singeing both sides of the fabric. The singeing and calendaring operations were conducted as usually known by those skilled in the art. Calendaring was intended to improve density and uniformity. Singeing was necessary to remove surface fiber and to improve the durability of the fabric in seat use and wear testing. The testing was conducted according to the seat wear test developed by the Boeing Aircraft Company. In addition to the advantages of removing loose fibers, the singeing operation also provided a heat setting purpose. The singeing operation was carried out on a singeing line where the fabric moved at a rate of between 12 to 16 yds/min with 12 yds/min being preferred. The preferred singeing temperature was 2800° F. As a result of foregone testing it was determined that the preferred fabric was at least approximately 9.0 oz/yd², and 9.3 oz/yd² was most preferred. The preferred fabric 9.3 oz/yd² also included the preferred treated scrim which was approximately 1.6 oz/yd².

While it was determined that calendaring was beneficial in all fabric tested, singeing was only needed for the wear testing and was not necessary to qualify the fabric as a seat blocking material.

What is claimed is:

1. A nonwoven, multiplied flame resistant fabric comprised of:
   at least two felted plies, each ply being further comprised of fibers selected from the group consisting of aramid fibers, polybenzimidazole fibers, and phenolic fibers, wherein the combined percentage by weight of said aramid and phenolic fibers is approximately 80% by weight of said felted ply with the aramid fibers being present in the range of about 10% to 60% and the phenolic fibers being present in the range of about 20% to 70%.; and
   the plies are united into a single fabric by fibers which are needled from the respective ply into the other ply.

2. The fabric of claim 1 wherein the fabric further comprises a woven scrim positioned between the respective plies.

3. The fabric of claim 1 further comprising a stabilized woven scrim positioned between the plies of the fabric.

4. The fabric of claim 3 further comprising a scrim of glass material.

5. The fabric of claim 1 wherein the polybenzimidazole fiber is present in the range of 3 to 20% of ply weight.

* * * * *